E. SHAW.
Wheels for Vehicles.
No. 166,151.  Patented July 27, 1875.
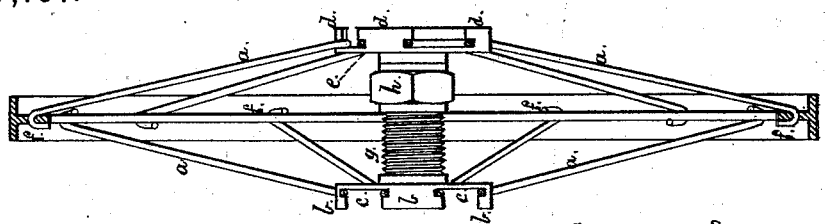
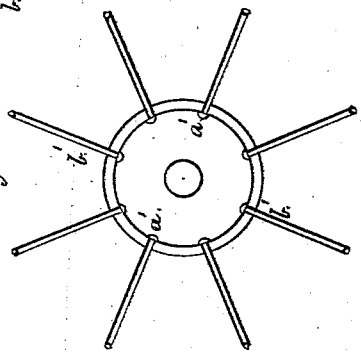
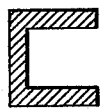
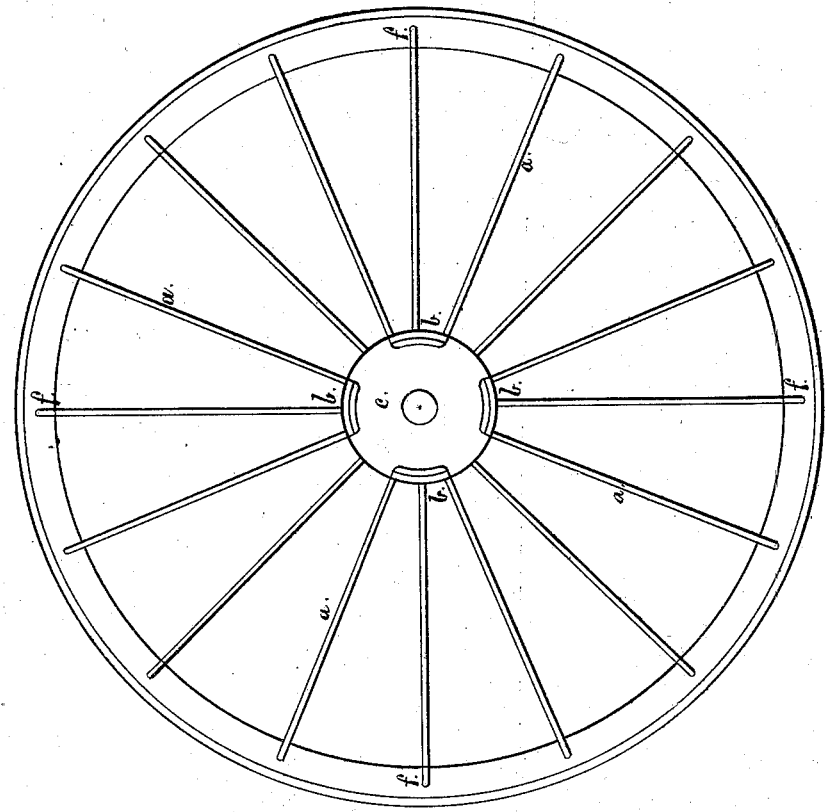
Witnesses:  
Septimus Hughes  
Charles Wm Collins
Inventor:  
Edward Shaw E. SHAW.
Wheels for Vehicles.
No. 166,151.
2 Sheets--Sheet 2.
Patented July 27, 1875.
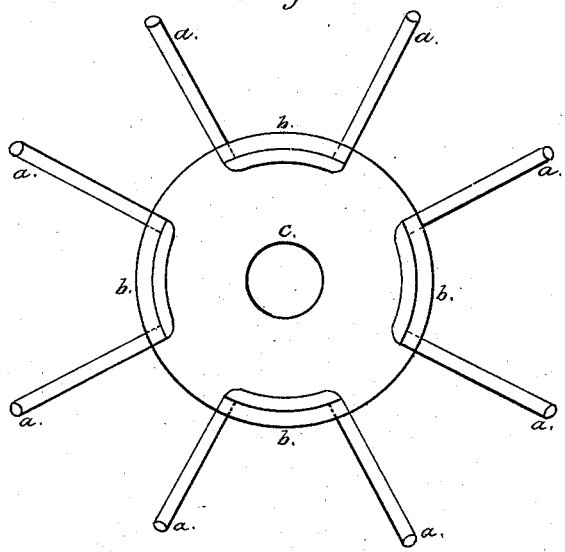
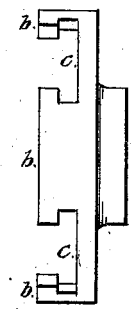
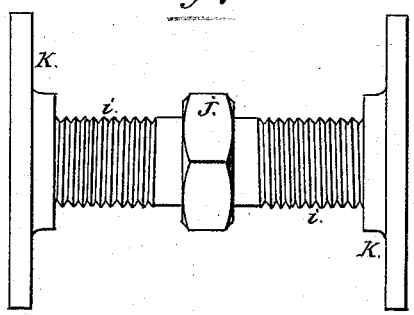
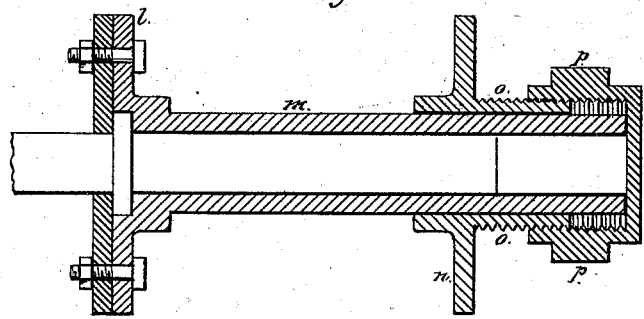
Witnesses:
Septimus Hughes
Charles Wm Collins
Inventor:
Edward Shaw

UNITED STATES PATENT OFFICE.

EDWARD SHAW, OF MANCHESTER, ENGLAND.

IMPROVEMENT IN WHEELS FOR VEHICLES.

Specification forming part of Letters Patent No. 166,151, dated July 27, 1875; application filed April 12, 1875.

*To all whom it may concern:*

Be it known that I, EDWARD SHAW, of the city of Manchester, in the county of Lancaster, England, perambulator manufacturer, have invented certain new and useful Improvements in Wheels; and I do hereby declare that the following is a full and exact description thereof, reference being had to the accompanying two sheets of drawings, and to the letters of reference marked thereon.

I make the felly of each wheel of T or ⊓⊔ shaped iron or steel, as shown in Figures 1 and 2, and drill or bore in them at suitable distances apart perforations to receive one end of the spokes. I form the spokes $a$ by bending one-half of them over snugs $b$, Figs. 3, 4, 5, and 6, cast to one disk, and hub $c$ and the other half over snugs $d$, cast to the disk and hub $e$, and either rivet the ends of the spokes to the fellies or pass them through holes and bend over the ends, as shown at $f$, Figs. 3 and 4.

In another arrangement shown in Fig. 12, Sheet 1, one end of the spoke is formed as a bolt-head, $a'$, and inserted into a slot, $b'$, in the hub, the other end being hooked into the felly; or, instead of either the before-named plans, the spokes may be fastened to both hub and felly by riveting. The two disks and hubs are separated from each other according to the size of the wheel, and in one arrangement I place between the two the screw $g$ and the nut $h$, Fig. 4, each having a hole for the axle, so that by turning the nut or screw in the proper direction the two disks and hubs or bosses can be forced from each other, and thereby give the spokes any required amount of rigidity or tension, there being a lock-nut or key when necessary to keep the parts firmly in their places.

In another arrangement, shown in Fig. 7, I employ right and left handed screws and nuts, the screws being marked $i$, the head of the screws $j$, and the nuts $k$; and it is evident that by turning the head and screws in the proper direction the disks and hubs or bosses can be separated from each other and give the proper tension to the spokes.

In another arrangement, shown in Fig 8, I cast against the inner side of one disk, $l$, a boss or collar, $m$, the other end of which is passed through the other disk $n$, on which there is a projection, $o$, having a screw on the outside incased in a nut, $p$, and the end of the boss or collar $m$ is in close contact with the inside of the nut, so that when the nut is turned in the proper direction it separates the disks from each other and gives the required tension to the spokes.

In each of the above descriptions the disk and boss may be made in one casting for the back part of the wheel.

This invention is applicable to wheels for almost all purposes where lightness and strength are essential, from perambulators and velocipedes to the heaviest railway-wagon wheels, and for riding or driving purposes will prove unequalled.

I do not broadly claim a hub constructed with a pair of disks to which spokes are attached, and so as to stand in a bracing position to the felly, as such I am aware is not new.

I claim—

The combination of the felly, the disks $c\ e$ on the hubs and spokes, connecting said disks and felly with nut and screw, substantially as described, for spreading said disks.

Done at Manchester, England, this 18th day of March, 1875.

EDWARD SHAW.

Witnesses:
  G. SEPTIMUS HUGHES,
    *Patent Agent, Manchester.*
  CHARLES WM. COLLINS.